US009212731B2

(12) United States Patent
Lindstrom

(10) Patent No.: US 9,212,731 B2
(45) Date of Patent: Dec. 15, 2015

(54) TENSIONER WITH MULTIPLE NESTED TORSION SPRINGS

(71) Applicant: James Kevin Lindstrom, Springdale, AR (US)

(72) Inventor: James Kevin Lindstrom, Springdale, AR (US)

(73) Assignee: DAYCO IP HOLDINGS, LLC, Troy, MI (US)

( * ) Notice: Subject to any disclaimer, the term of this patent is extended or adjusted under 35 U.S.C. 154(b) by 83 days.

(21) Appl. No.: 13/951,734

(22) Filed: Jul. 26, 2013

(65) Prior Publication Data

US 2015/0031485 A1    Jan. 29, 2015

(51) Int. Cl.
    *F16H 7/10* (2006.01)
    *F16H 7/12* (2006.01)
    *F16H 7/08* (2006.01)

(52) U.S. Cl.
    CPC ........ *F16H 7/1218* (2013.01); *F16H 2007/081* (2013.01); *F16H 2007/084* (2013.01); *F16H 2007/0893* (2013.01)

(58) Field of Classification Search
    CPC ............ F16H 2007/081; F16H 7/1281; F16H 7/1218; F16H 2007/0806; F16H 2007/0893
    USPC .......................................... 474/112, 133, 135
    See application file for complete search history.

(56) References Cited

U.S. PATENT DOCUMENTS

| | | | | |
|---|---|---|---|---|
| 2,051,735 A | * | 8/1936 | Michelson | 242/372 |
| 2,481,037 A | * | 9/1949 | Pringle | 254/340 |
| 3,618,730 A | * | 11/1971 | Mould, III | 192/56.2 |
| 4,285,676 A | * | 8/1981 | Kraft | 474/135 |
| 4,473,362 A | * | 9/1984 | Thomey et al. | 474/135 |
| 4,696,663 A | * | 9/1987 | Thomey et al. | 474/133 |
| 4,763,764 A | * | 8/1988 | Smith | 192/41 S |
| 4,813,915 A | * | 3/1989 | Kotzab | 474/133 |
| 4,826,471 A | * | 5/1989 | Ushio | 474/135 |
| 5,195,932 A | * | 3/1993 | Hirai et al. | 474/135 |
| 5,620,385 A | * | 4/1997 | Cascionale et al. | 474/112 |
| 6,098,757 A | * | 8/2000 | Stephenson | 185/10 |
| 6,220,586 B1 | * | 4/2001 | Pavlin et al. | 267/155 |

(Continued)

FOREIGN PATENT DOCUMENTS

| | | |
|---|---|---|
| GB | 600347 | 4/1948 |
| JP | 2003287096 | 10/2003 |

(Continued)

OTHER PUBLICATIONS

PCT, International Search Report and Written Opinion, PCT/US2014/048114, (Nov. 12, 2014).

(Continued)

*Primary Examiner* — Henry Liu
(74) *Attorney, Agent, or Firm* — Thompson Hine LLP

(57) ABSTRACT

A tensioner is disclosed that may be part of a power system where the tensioner provides tension to an endless power transmitting element such as a belt, chain, or other continuous loop. The tensioner has an arm that is rotatable about a first axis. The tensioner also includes an outer spring and at least one inner spring. The outer spring has an outer coil that defines an outer diameter. The inner spring has an inner coil that defines an inner diameter. The inner diameter of the inner coil is less than the outer diameter of the outer coil such that at least a portion of the inner spring is received by the outer spring. The outer spring and the inner spring both urge the arm to rotate about the first axis and into tensioning engagement with the power transmitting element.

15 Claims, 9 Drawing Sheets

(56) References Cited

U.S. PATENT DOCUMENTS

| | | | |
|---|---|---|---|
| 6,264,578 B1* | 7/2001 | Ayukawa | 474/135 |
| 6,375,588 B1* | 4/2002 | Frankowski et al. | 474/112 |
| 7,217,207 B1* | 5/2007 | Hallen | 474/135 |
| 7,273,432 B2* | 9/2007 | Schonmeier et al. | 474/135 |
| 7,507,172 B2* | 3/2009 | Lehtovaara et al. | 474/109 |
| 7,803,078 B2* | 9/2010 | D'Silva et al. | 474/117 |
| 8,118,698 B2* | 2/2012 | Guhr | 474/135 |
| 8,142,315 B2* | 3/2012 | Dell | 474/135 |
| 8,167,284 B2* | 5/2012 | Kuroda | 267/156 |
| 8,562,466 B2* | 10/2013 | Mevissen et al. | 474/135 |
| 8,613,680 B2* | 12/2013 | Frankowski et al. | 474/135 |
| 2002/0010045 A1* | 1/2002 | Serkh | 474/135 |
| 2006/0100049 A1* | 5/2006 | Lannutti et al. | 474/133 |
| 2006/0100050 A1* | 5/2006 | Crist et al. | 474/135 |
| 2010/0140044 A1 | 6/2010 | Antchak et al. | |

FOREIGN PATENT DOCUMENTS

| | | |
|---|---|---|
| JP | 3842685 | 11/2006 |
| WO | 2007/051788 | 5/2007 |

OTHER PUBLICATIONS

PCT, International Search Report and Written Opinion, PCT/US2014/048112, (Nov. 13, 2014).

* cited by examiner

TENSIONER WITH MULTIPLE NESTED TORSION SPRINGS

TECHNICAL FIELD

The present invention relates generally to tensioners and more particularly to a tensioner utilizing multiple torsion springs arranged in a nested configuration, where the multiple torsion springs operate together as a single, compact torsion spring.

BACKGROUND

The main purpose of a belt tensioner that automatically responds to fluctuations in the movements of an endless belt is to prolong the life of the belt itself, or of engine components such as accessories operating in conjunction with the belt. Belt tensioners are typically used in front-end accessory drives in an automobile engine. A front-end accessory drive often includes pulley sheaves for each accessory the belt is required to power, such as the air conditioner, water pump, fan and alternator. Each of these accessories requires varying amounts of power at various times during operation. These power variations, or torsionals, create a slackening and tightening situation of each span of the belt. The belt tensioner is utilized to absorb these torsionals through use of an internally mounted torsion spring. The torsion spring is operatively coupled between an arm and a base housing of the belt tensioner so as to force a distal end of the arm against the belt and, in turn, to provide sufficient tension force, via a pulley, on the belt as required.

In some instances, the belt may experience torsional loads that are large enough to rotate the distal end of the arm of the belt tensioner away from the belt, which causes tension in the belt to be temporarily reduced. In order to counteract the large torsional loads that rotate the distal end of the arm of the belt tensioner away from the belt, the force exerted by the torsion spring in the belt tensioner is increased. The force exerted by the torsion spring may be increased by thickening the coils of the torsion spring, and/or by adding coils to the torsion spring. However, thickening the coils of the torsion spring increases the width of the torsion spring, and adding coils to the torsion spring increases the height of the torsion spring. Increasing the width or height of the torsion spring will increase the amount of packaging space required by the belt tensioner. Therefore, it may be challenging to package the belt tensioner, especially in applications where packaging space is limited.

SUMMARY

In one aspect, a tensioner is disclosed that includes utilizing multiple torsion springs that are arranged in a nested configuration. Specifically, each of the multiple torsion springs may have graduated coil diameters, where one of the torsions springs fits within another torsion springs that that has a slightly larger coil diameter. Arranging the torsion springs in a nested configuration will result in a reduced amount of packaging space needed by the tensioner.

In one embodiment, a tensioner including an arm, an outer spring, and at least one inner spring is disclosed. The arm is rotatable about a first axis, and has an arm arbor. The outer spring is operatively coupled to the arm arbor. The outer spring has an outer coil that defines an outer diameter. The inner spring is operatively coupled to the arm arbor. The inner spring has an inner coil that defines an inner diameter. The inner diameter of the inner coil is less than the outer diameter of the outer coil such that at least a portion of the inner spring is received by the outer spring. The outer spring and the inner spring both urge the arm to rotate about the first axis into tensioning engagement with a power transmitting element. The inner spring and the outer spring may be connected with one another in either a series configuration or a parallel configuration to act as a single, compact torsion spring.

In another embodiment, the tensioner includes a support member for receiving the arm arbor, the inner spring, and the outer spring. The support member is stationary and includes a pivot shaft that defines the first axis. The arm is rotatably mounted to the pivot shaft.

In one embodiment, the inner spring and the outer spring are connected to one another in the series configuration. The tensioner includes a hub that is rotatable about the pivot shaft. A first end portion of the outer spring is connected to the arm arbor, and a second end portion of the outer spring is connected to the hub. A first end portion of the inner spring is fixedly attached to the support member, and a second end portion of the spring is fixedly attached to the hub.

In another embodiment, the inner spring and the outer spring are connected to one another in the parallel configuration. The first end portion of the outer spring is connected to the support member, and the second end portion of the outer spring is connected to the arm arbor. The first end portion of the inner spring is fixedly attached to the support member, and the second end portion of the spring is fixedly attached to the arm arbor.

In yet another embodiment, a tensioner is disclosed that may be part of a power system where the tensioner provides tension to an endless power transmitting element. The tensioner includes a support member including a pivot shaft that defines a first axis, an arm, an outer spring, and at least one inner spring. The arm has an arm arbor mounted on the pivot shaft for rotatable movement of the arm about the first axis. The arm arbor defines a cavity. The outer spring is received by the cavity of the arm arbor and is operatively coupled to the arm and the support member. The outer spring has an outer coil that defines an outer diameter. The inner spring is received by the cavity of the arm arbor and is operatively coupled to the arm and the support member. The inner spring has an inner coil that defines an inner diameter. The inner diameter of the inner coil is less than the outer diameter of the outer coil such that at least a portion of the inner spring is received by the outer spring. The outer spring and the inner spring both urge the arm to rotate about the first axis into tensioning engagement with a power transmitting element. The support member receives the arm arbor, the inner spring, and the outer spring. The inner spring and the outer spring may be connected with one another in either a series configuration or a parallel configuration to act as a single, compact torsion spring.

DETAILED DESCRIPTION

Figure 1:
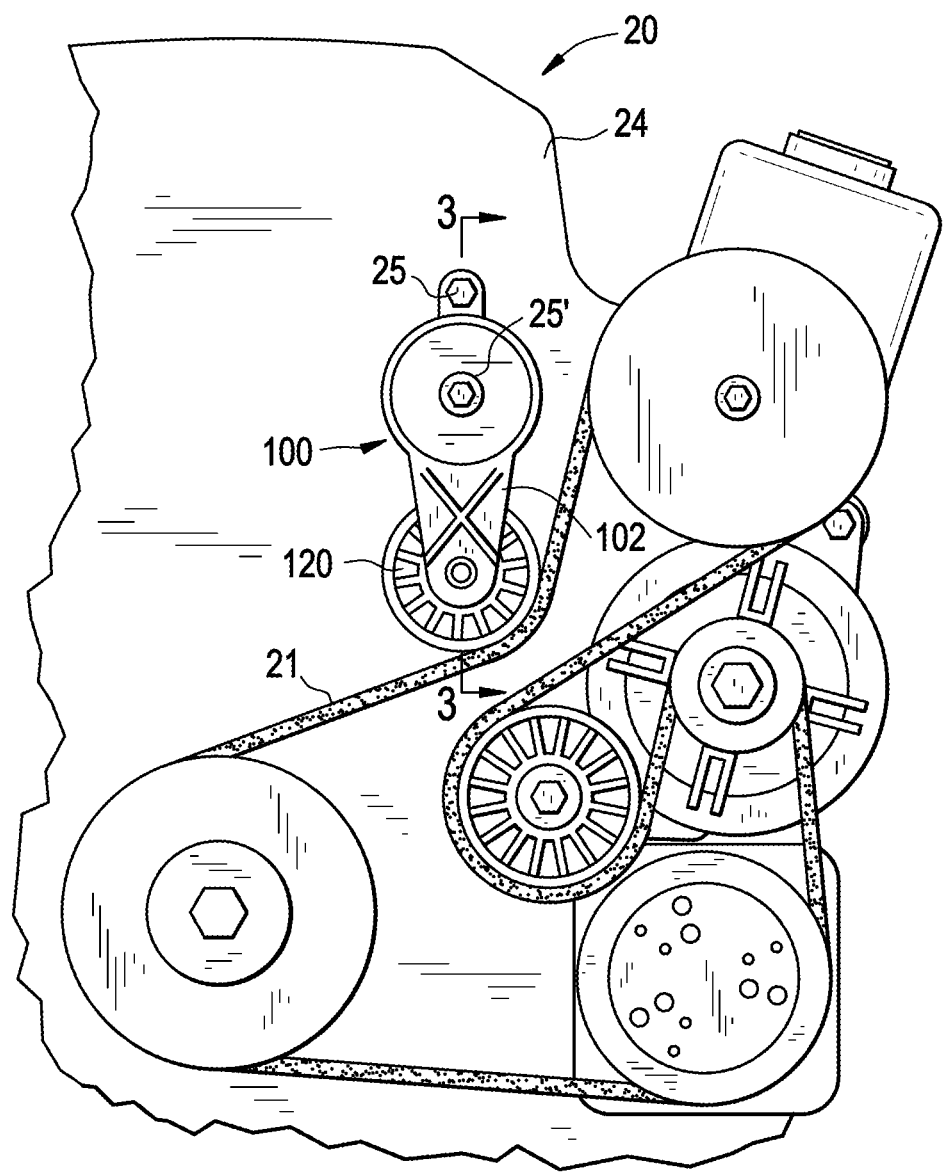
FIG. 1 is a front view of an engine which utilizes an embodiment of a tensioner.

The following detailed description will illustrate the general principles of the invention, examples of which are additionally illustrated in the accompanying drawings. In the drawings, like reference numbers indicate identical or functionally similar elements.

Disclosed herein is a tensioner including multiple torsion springs that are arranged in a nested configuration. The multiple torsion springs may be connected with one another in either a series configuration or a parallel configuration, where the multiple torsion springs each urge an arm of the tensioner to rotate about an axis and into tensioning engagement with an endless power transmitting element. The tensioner is typically part of a power system, where the tensioner provides tension to the power transmitting element. The power transmitting element may be, for example, a belt, chain, or other continuous loop that is in a system driven by at least one source and that also drives at least one accessory. Tensioning a slack power transmitting element is an unwinding of a wound-up tensioner, which will be referred to herein as the tensioning direction T. In the opposite direction, referred to herein as the winding direction W, a winding up of the tensioner occurs in response to a prevailing force of the power transmitting element, which is tightening in the span where the tensioner resides.

Referring now to FIG. 1, an engine is generally indicated by the reference numeral 20 and utilizes an endless power transmitting element 21 for driving a plurality of driven accessories as is well known in the art. The belt tensioner of this invention, generally designated as 100, is utilized to provide a tensioning force on the endless power transmitting element 21. The endless power transmission element 21 may be of any suitable type known in the art. The tensioner 100 is configured to be fixed to a mounting bracket or support structure 24 of the engine 20 by a plurality of fasteners 25. The fasteners may be bolts, screws, welds, or any other suitable fastener known in the art that will hold the tensioner in place during operation of the engine. The mounting bracket or supporting structure 24 may be of any configuration and include any number of openings for receiving the fasteners 25.

Figure 2:
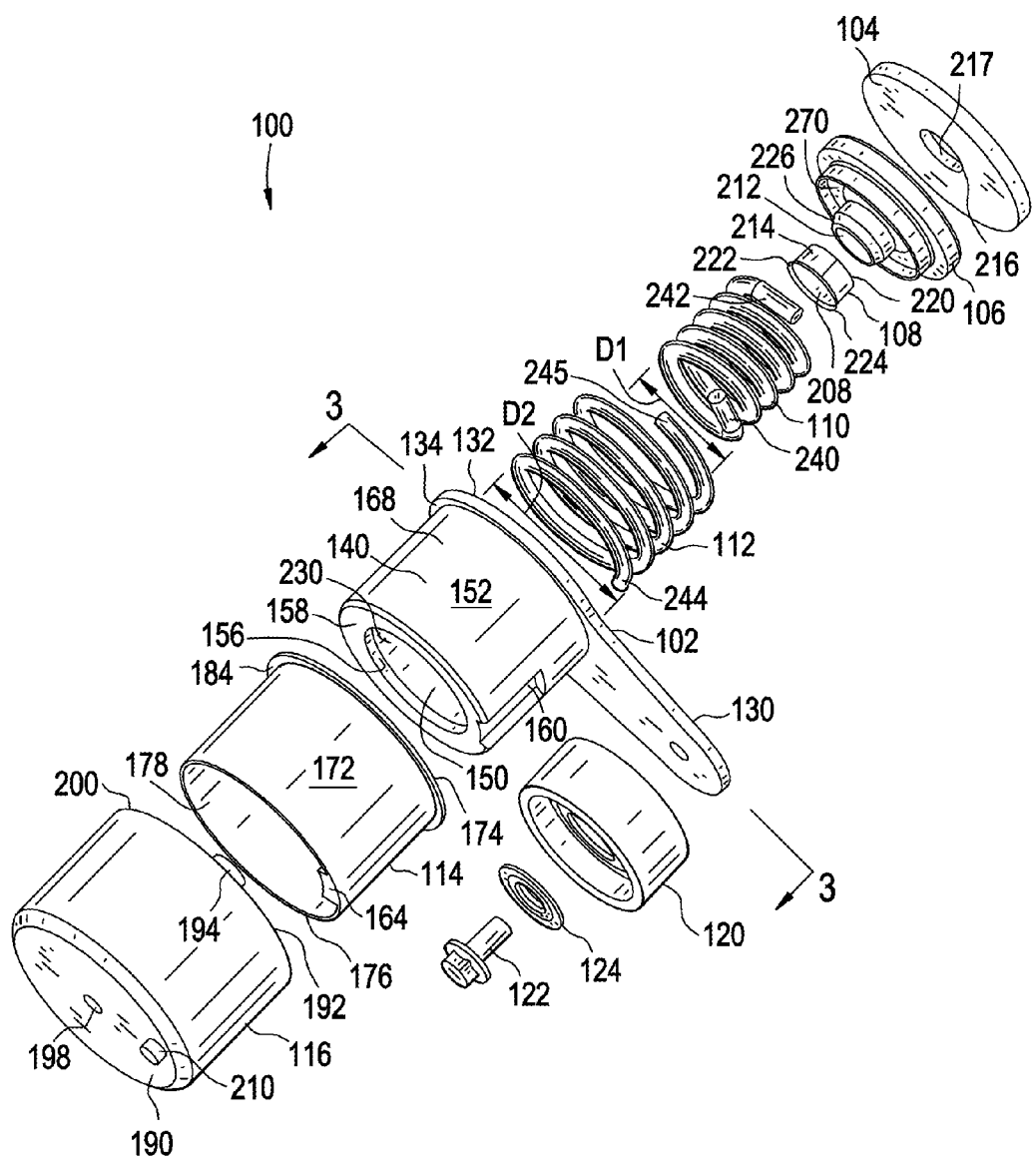
FIG. 2 is an exploded perspective view of an embodiment of a tensioner.
Figure 3:
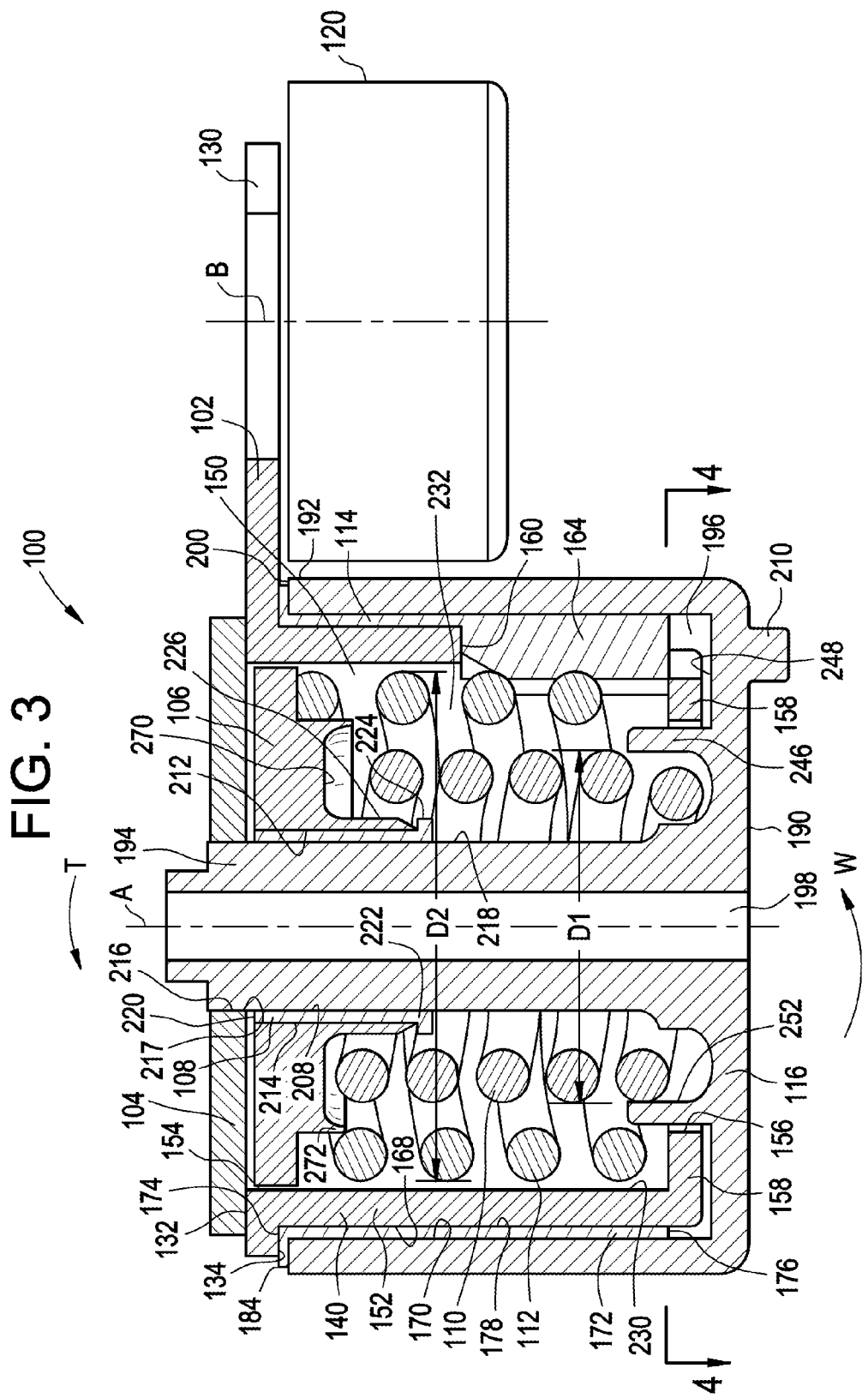
FIG. 3 is a side, partial cross-sectional view of a portion of the tensioner of FIG. 2 taken along line 3-3.

Referring to FIGS. 2-3, the tensioner 100 includes a tensioner arm 102 rotatable about a first axis A in the tensioning direction T and in the winding direction W. The tensioner 100 also includes a cap 104, a hub 106, a pivot bushing 108, an inner spring 110, an outer spring 112, a bushing 114, and a support member 116. The arm 102 includes a pulley 120 rotatably mounted to a first end 130 of the arm 102 for rotation about a second axis B that is spaced from and parallel to the first axis A (the pulley 120 is not cross-sectioned in FIG. 3). The pulley 120 may be coupled to the arm 102 with a fastener 122 such as, for example, a bolt, screw, pin, or rivet. The fastener 122 may secure a dust cover 124 to the pulley 120.

An arm arbor 140 is located at a second end 132 of the arm 102. The arm arbor 140 extends from a bottom surface 134 of the arm 102 about the first axis A. The arm arbor 140 may include a sleeve 152 that has an open first end 154 (shown in FIG. 3). The sleeve 152 also includes a partial bottom 158 that defines an open second end 156. The second end 156 has a smaller opening compared to the first end 154 (seen in FIG. 3). In one embodiment, the sleeve 152 is substantially cylindrical and defines a cavity 150 for receiving the inner spring 110 and the outer spring 112. Within the sleeve 152 one or more slots 160 are present that extend therethrough, i.e., the slots 160 are open from the exterior surface of the arm arbor 140 and extend into an interior of the arm arbor 140. Upon assembly of the tensioner 100, the first end 154 of the sleeve 152 may be closed by the hub 106 and the second end 156 of the sleeve 152 may be closed by the support member 116. The cap 104 and the support member 116 may enclose the components of the tensioner 100 such as the hub 106, the pivot bushing 108, the inner spring 110, the outer spring 112, the bushing 114, and the arm arbor 140. The cap 104 and the support member 116 protect the hub 106, the pivot bushing 108, the inner spring 110, the outer spring 112, the bushing 114, and the arm arbor 140 from contaminants.

The slots 160 may extend through the sleeve 152 and into the partial bottom 158. The portion of the slots 160 in the partial bottom 158 only extend partially radially, inward into the partial bottom 158, such that the partial bottom 158 is circumferentially discontinuous at its outer periphery and circumferentially continuous at its inner periphery, where the inner periphery of the partial bottom 158 is defined as the edge closest to the first axis A. The circumferentially continuous inner periphery helps stabilize or provide rigidity to the open second end 156 of the sleeve 152 and provides the arm arbor 140 with fixed dimensions. In one embodiment, the sleeve 152 is substantially cylindrical and has a fixed diameter.

The bushing 114 is positioned or positionable between an outer surface 168 of the arm arbor 140 and an interior surface 170 (shown in FIG. 3) of the support member 116. The bushing 114 includes a sleeve 172 having a first open end 174 and a second open end 176 and one or more protrusions 164 extending inward from an interior surface 178 of the sleeve 172 toward the first axis A. In one embodiment, the sleeve 172 is generally cylindrical. In the exemplary embodiment as shown in FIGS. 2-3, the bushing 114 includes a single protrusion 164, and the arm arbor 140 includes a single slot 160, however it is understood that the bushing 114 may include any number of protrusions 164, and the arm arbor 140 may include any number of slots 160. The number of protrusions 164 preferably matches the number of slots 160 in the arm arbor 140 such that the bushing 114 is mateable with the arm arbor 140, where the protrusions 164 are received in the slots 160. Accordingly, the protrusions 164 are shaped to mate with the slots 160 of the arm arbor 140. In one embodiment, the protrusions 164 are also dimensioned to extend into the cavity 150 of the arm arbor 140 (shown in FIG. 3).

In one embodiment, the bushing 114 may be constructed of a generally elastic material to allow for the bushing 114 to expand in a radially outward direction with respect to the first axis A. In an alternative embodiment, the bushing 114 may include a slit (not shown), which extends from the first open end 174 to the second open end 176. The slit may allow the bushing 114 to expand in the radially outward direction with respect to the first axis A.

As best seen in FIG. 3, in one embodiment the support member 116 has a closed end 190 and an open end 192. The support member 116 also includes a pivot shaft 194 that extends from the closed end 190 towards the open end 192. In one embodiment, the pivot shaft 194 may extend beyond the open end 192 of the support member 116. The support member 116 also includes a cavity 196 that is defined by the closed end 190 and the open end 192. The arm arbor 140 is received by the cavity 196 of the support member 116. The arm 102 is rotatably mounted to the pivot shaft 194 of the support member 116, where the pivot shaft 194 defines the first axis A. The support member 116 may facilitate mounting the tensioner 100 in place relative to the power transmitting element 21 (shown in FIG. 1). In one embodiment, the pivot shaft 194 is generally centrally positioned within the cavity 196 of the support member 116, and has an axially extending opening 198 or bore that may receive a bolt, screw, pin, or other fastener 25' (shown in FIG. 1) to hold the assembled tensioner 100 together and/or to mount the tensioner 100 to a surface relative to the power transmitting element 21. In one embodiment, the support member 116 may include a positioning pin 210 located on an exterior surface of the closed end 190 of the support member 116. The mounting bracket or supporting structure 24 of the engine 20 (shown FIG. 1) may include a receptacle (not illustrated) that receives the positioning pin 210. While the embodiment as shown in FIGS. 1-5 illustrate the support member 116 being secured to the supporting structure 24 by the fastener 25' received by the bore 198, it is understood various other approaches may be used as well to secure the support member 116 to the supporting structure 24.

The support member 116 may also receive and/or house at least part of the bushing 114, the hub 106, the inner spring 110, and the outer spring 112 within the cavity 196. In one embodiment, the support member 116 may include an upper rim 200 extending about the periphery of the open end 192 of the cavity 196. The bushing 114 may include an upper flange 184 that extends outward about the periphery of the first open end 174. The flange 184 of the bushing 114 may be seated against the upper rim 200 of the support member 116.

The cap 104 includes a generally centrally located bore 216 for receiving the pivot shaft 194, where the cap 104 is fixedly attached to the support member 116. Specifically, an inner surface 217 of the bore 216 (shown in FIG. 2) may be fixedly attached to an outer surface 218 of the pivot shaft 194. In one embodiment, the inner surface 217 of the bore 216 may be fixedly attached to the outer surface 218 of the pivot shaft 194 by radial riveting, however it is to be understood that any type of joining approach for fixedly attaching the inner surface 217 of the bore 216 to the outer surface 218 of the pivot shaft 194 may be used as well.

As best seen in FIG. 3, the pivot shaft 194 may be received by the pivot bushing 108, where an inner surface 208 of the pivot bushing 108 contacts the outer surface 218 of the pivot shaft 194. Referring generally to FIGS. 2-3, the hub 106 includes an opening 212, where an outer surface 214 of the pivot bushing 108 is received by the opening 212 of the hub 106. The hub 106 is rotatable about the pivot shaft 194. The pivot bushing 108 may be used reduce wear of both the pivot shaft 194 and the hub 106. In one embodiment, the pivot bushing 108 includes an upper opening 220 and a lower opening 222, where a flange 224 extends radially outward about a periphery of the lower opening 222. In one embodiment, the opening 212 of the hub 106 extends inwardly into the cavity 150 of the arm arbor 140, and defines a rim 226. The rim 226 of the hub 106 may be seated against the flange 224 of the pivot bushing 108.

Figure 4:
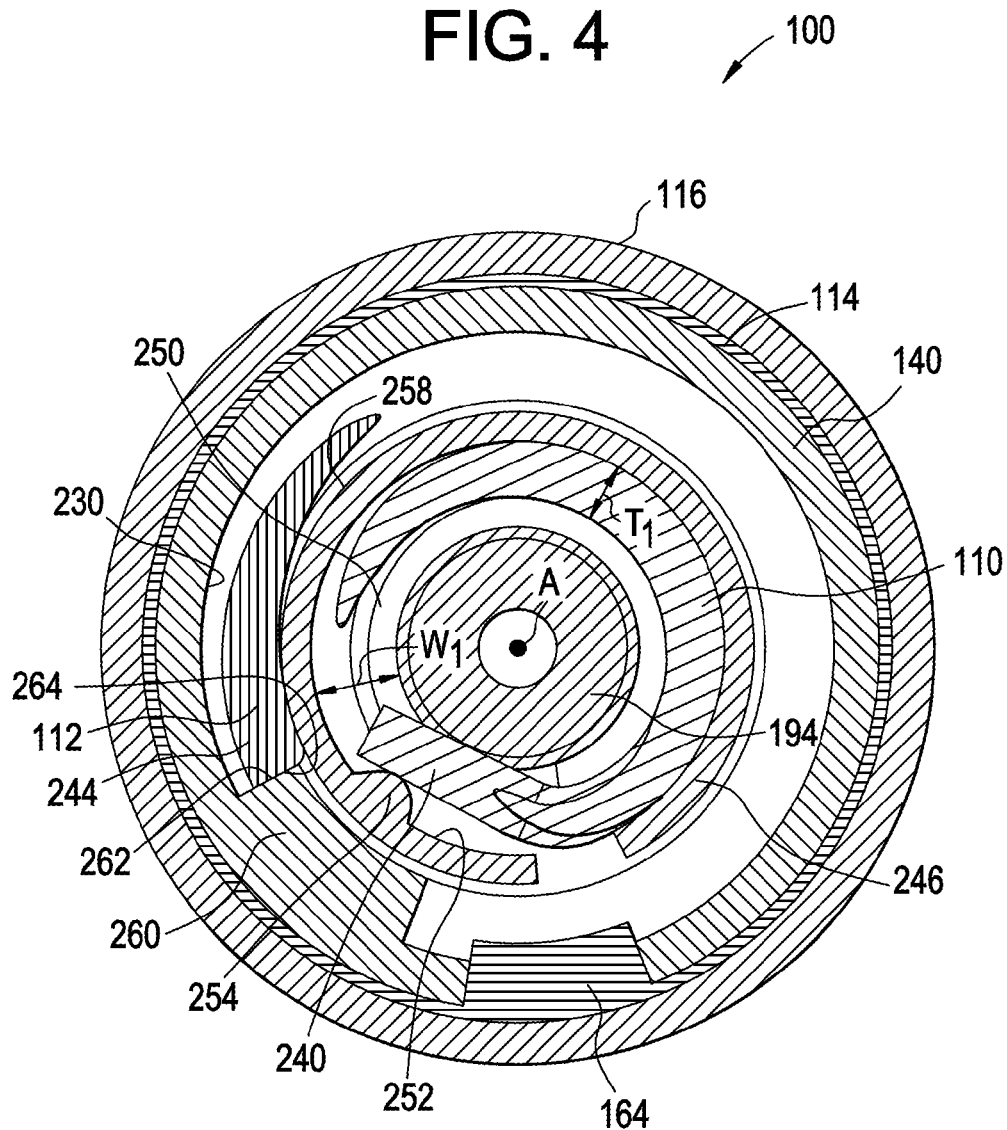
FIG. 4 is a cross-sectional view of the tensioner of FIG. 3 taken along line 4-4.

The inner spring 110 and the outer spring 112 are both operatively coupled to the arm arbor 140 and the support member 116. The inner spring 110 and the outer spring 112 are also connected with one another in a series configuration to act as a single, compact torsion spring. Specifically, the hub 106 may be used to tie or connect the inner spring 110 with the outer spring 112, where torque is shared between the inner spring 110 and the outer spring 112. The inner spring 110 and the outer spring 112 cooperate together to urge the arm 102 to rotate about the first axis A about the pivot shaft 194 of the support member 116. Although a series configuration is illustrated in FIGS. 2-4, it is to be understood that the inner spring 110 and the outer spring 112 may be arranged in a parallel configuration as well, and is described in greater detail below with illustration in FIGS. 6-9.

Both the inner spring 110 and the outer spring 112 may be torsional springs having any shape and/or configuration. In one embodiment, the inner spring 110 and the outer spring 112 may be round-wire springs. In another embodiment, either or both the inner spring 110 and the outer spring 112 may be a square or rectangular spring or a square or rectangular coil spring. One of skill in the art will appreciate that these various torsional springs may require alternate spring end engagement points within the tensioner to provide secure attachments so that the spring winds and unwinds appropriately to bias the arm 102.

As best seen in FIG. 3, both the inner spring 110 and the outer spring 112 are seated within the cavity 150 in the arm arbor 140. The coils of the outer spring 112 are juxtaposed with an inner surface 230 of the arm arbor 140. The coils of the outer spring 112 are also juxtaposed with the protrusion 164 of the bushing 108. The coils of the inner spring 110 surround the outer surface 218 of the pivot shaft 194. The coils of the inner spring 110 define an inner spring coil diameter D1, and the coils of outer spring 112 define an outer spring coil diameter D2. The inner spring coil diameter D1 is less than the outer spring coil diameter D2 such that at least a portion of the inner spring 110 fits within or is received by the outer spring 112. That is, the coils of the outer spring 112 define a cavity 232 that receives at least a portion of the inner spring 112. Thus, at least a portion of the coils of the inner spring 110 are surrounded by the coils of the outer spring 112, and the inner spring 110 is nested at least partially within the outer spring 112. While only one inner spring 110 is illustrated, it is to be understood that the tensioner 100 may include multiple inner springs as well, where each of the inner springs may be nested within one another. Specifically, the inner springs may have graduated coil diameters where one of the inner springs may fit within another inner spring that that has a slightly larger coil diameter.

In the embodiment as shown in FIGS. 2-5, the inner spring 110 is wound in the winding direction W and the outer spring 112 is wound in the tensioning direction T. Accordingly, when the arm 102 rotates about the first axis A in the winding direction W in response to belt loading or other prevailing forces on the power transmitting element 21 (shown in FIG. 1), the inner spring 110 is wound, while the outer spring 112 is unwound. Thus, the inner spring 110 will constrict radially inward towards the first axis A, and the outer spring 112 will expand radially outward towards the first axis A. It is noted that the unwinding of the outer spring 112 as the arm 102 rotates about the first axis A is in the winding direction W is typically uncharacteristic for tensioners. When the belt loading or other prevailing forces on the power transmitting element 21 dissipate, the arm 102 rotates about the first axis A in the tensioning direction T. Accordingly, the inner spring 110 is unwound, and the outer spring 112 is wound. Thus, the inner spring will expand radially outward away from the first axis A, and the outer spring will constrict radially inward towards the first axis A.

Although FIGS. 2-5 illustrate the inner spring 110 wound in the winding direction W and the outer spring 112 wound in the tensioning direction T, it is to be understood that the inner spring 110 and the outer spring 112 may be wound in other configurations as well. For example, in an alternative embodiment the inner spring 110 may be wound in the tensioning direction T instead, and the outer spring 112 is wound in the winding direction W. In another embodiment, the inner spring 110 and the outer spring 112 may be wound in the same direction. For example, both the inner spring 110 and the outer spring 112 may be wound in either the tensioning direction T, or the winding direction W.

The specific winding direction of the inner spring 110 and the outer spring 112 may be determined based on the tensioning force the tensioner 100 is required to exert on the endless power transmitting element 21 (FIG. 1). The winding direction of the inner spring 110 and the outer spring 112 may also be determined based on a damper or damping mechanism, for example a frictional damper, that is incorporated with the tensioner 100. In one embodiment, the frictional damper is used to resist movement of the power transmitting element 21, without affecting rotation of the tensioner 100 to tension the power transmitting element 21. In another embodiment, the frictional damper may be used to resist rotation of the tensioner 100 to tension the power transmitting element 21, without affecting rotation of the tensioner 100 in response to a prevailing force of the power transmitting element 21. These types of dampers, which dampen rotation of the tensioner 100 in one direction, are referred to as asymmetric dampers.

In the embodiment as shown in FIGS. 2-5, the outer spring 112 is wound in the tensioning direction T and applies frictional damping to resist movement of the power transmitting element 21. Specifically, referring to FIGS. 2-3, as the arm 102 rotates in the winding direction W, the outer spring 112 is unwound and the coils of the outer spring 112 expand outward. As the outer spring 112 unwinds, the outer spring coil diameter D2 will increase, and the coils of the outer spring 112 will expand into the protrusion 164 of the bushing 114, thereby directing the bushing 114 radially outward relative to the arm arbor 104. The bushing 114 will expand radially and frictionally engage with the interior surface 170 of the support member 116, while the arm arbor 104 remains stationary in the radial direction and does not expand. Thus, the expansion of the outer spring 112 applies frictional damping in the winding direction W.

In one embodiment, the inner spring 110 may also be used to provide friction damping as well. For example, as the arm rotates in the winding direction W, the inner spring 100 may be wound up and the coils of the inner spring 110 expand inward. As the inner spring 110 winds up, the inner spring coil diameter D1 will decrease, and the coils of the inner spring 110 will contract into a pivot shaft bushing (not illustrated) that is placed around the outer surface 218 of the pivot shaft 194. The pivot shaft bushing radially contracts and frictionally engages with the outer surface 218 of the pivot shaft 194. Thus, the contraction of the inner spring 112 may also apply frictional damping in the winding direction W.

In another embodiment, the inner spring 110 and the outer spring 112 may be wound to dampen rotation of the tensioner 100 in two directions. Specifically, the frictional damper is used to resist movement of the power transmitting element 21 as well rotation of the tensioner 100 to tension the power transmitting element 21. These types of dampers, which dampen rotation of the tensioner 100 in two directions, are referred to as symmetric dampers. For example, in an alternative embodiment the inner spring 110 and the outer spring 112 are both wound in the tensioning direction T to provide symmetric damping. Specifically, as the arm 102 rotates in the winding direction W, the outer spring 112 is unwound and the coils of the outer spring 112 expand outward and cause the bushing 114 to frictionally engage with the interior surface 170 of the support member 116. Expansion of the outer spring 112 provides frictional damping to the belt tensioner 100 in the winding direction W. Likewise, as the arm 102 rotates in the tensioning direction T, the inner spring 110 is wound and the coils of the inner spring 110 expand inward and cause a pivot shaft bushing (not shown) to frictionally engage with the outer surface 218 of the pivot shaft 194. Contraction of the inner spring 110 provides frictional damping to the belt tensioner 100 in the tensioning direction T. Thus, the inner spring 110 and the outer spring 112 provide frictional damping in both the tensioning direction T and the winding direction W. Although winding both the inner spring 110 and the outer spring 112 in the tensioning direction T is discussed, it is understood that the inner spring 110 and the outer spring 112 may be wound in a variety of configurations to provide symmetric damping.

Referring to FIGS. 2-4, the inner spring 110 includes a first end portion 240 and a second end portion 242. The inner spring 110 is fixedly attached and grounded to the support member 116. The inner spring 110 is also fixedly attached to the hub 106. Specifically, the first end portion 240 of the inner spring 110 is fixedly attached to the support member 116, and the second end portion 242 of the inner spring 110 is fixedly attached to the hub 106. The outer spring 112 also includes a first end portion 244 and a second end portion 245. The outer spring 112 is connected to the hub 106 and the arm 102. Specifically, the first end portion 244 of the outer spring 112 is connected to the arm arbor 140, and the second end portion 245 of the outer spring 112 is connected to the hub 106.

The support member 116 includes a flange 246 (shown in FIGS. 3-4) that is located along a bottom surface 248 (shown in FIG. 3) of the closed end 190 of the support member 116. The flange 246 projects inwardly into the cavity 196 of the support member 116. As shown in FIG. 4, the pivot shaft 194 and the flange 246 cooperate together to define a track 250. The track 250 may include a generally annular configuration, and may match the curvature of the inner spring 110. The track 250 may include a width W1 that is greater than a thickness T1 of the coil of the inner spring 110 such that the coils of the inner spring 110 may expand or contract within the track 250.

Referring to FIG. 4, an inner surface 252 of the flange 246 that generally opposes the pivot shaft 194 may include a retaining feature such as, for example, a protrusion 254 that extends inward towards the first axis A. The protrusion 254 and the pivot shaft 194 corporate together to fixedly attach the first end portion 240 of the inner spring 110 to the support member 116. Specifically, the first end portion 240 of the inner spring 110 is wedged between the protrusion 254 and the pivot shaft 194, thereby securing the inner spring 110 to the support member 116. It is understood that while the protrusion 254 is illustrated in FIG. 4, the support member 116 may include other types of retaining features as well such as, for example, a bracket, or any receptacle that is configured to fixedly attach the first end portion 240 of the inner spring 110 to the support member 116. Also, it is understood that in an alternative embodiment, the first end portion 240 of the inner spring 110 may include a hook (not shown). The hook acts as a catch to engage with the protrusion 254, thereby attaching the inner spring 110 to the support member 116.

The first end 244 of the outer spring 112 may be disposed between an outer surface 258 of the flange 246 and the inner surface 230 of the arm arbor 140. Referring to both FIGS. 3 and 4, the partial bottom 158 of the arm arbor 140 includes an abutment feature 260 (shown in FIG. 4) that is positioned within an interior of the sleeve 152. As seen in FIG. 4, in one embodiment the abutment feature 260 is a partition or a protrusion that provides a generally planar surface 262, where a planar surface 264 of the first end portion 244 of the outer spring 112 abuts directly against the abutment feature 260.

Although planar surface 262 is shown in FIG. 4, it is to be understood that in an alternative embodiment the abutment feature 260 may be a sleeve, a bracket, a recess, or another receptacle that the first end portion 244 of the outer spring 112 fits into to connect the outer spring to the arm 102.

Figure 5:
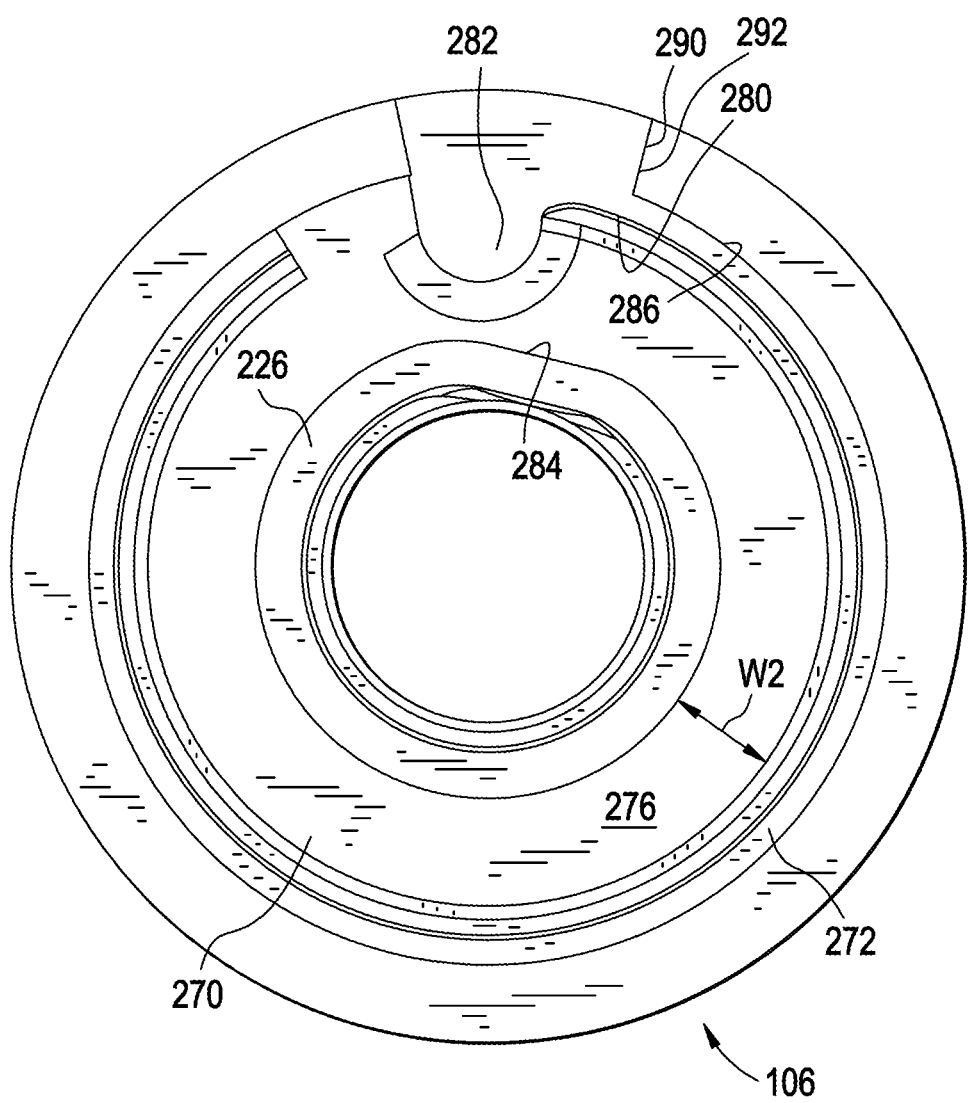
FIG. 5 is a bottom view of an underside of a hub shown in FIG. 2.

Referring to FIGS. 3 and 5, a bottom surface 270 of the hub 106 include a flange 272 that extends inwardly into the cavity 150 of the arm arbor 140 (shown in FIG. 3). The flange 272 is located radially outward of the rim 226. Both the flange 272 and the rim 226 cooperate together to define a track 276 (shown in FIG. 5). The track 276 may include a generally annular configuration, and may match the curvature of the inner spring 110. The track 276 may include a width W2 that is greater than the thickness T1 of the coil of the inner spring 110 (the thickness T1 of the inner spring 110 is shown in FIG. 4) such that the coils of the inner spring 110 may expand or contract within the track 276.

An inner surface 280 of the rim 270 may include a retaining feature such as, for example, a protrusion 282 (shown in FIG. 5) that extends inward towards the first axis A. The protrusion 282 and a generally flattened surface 284 located around the rim 226 corporate together to secure the second end portion 242 of the inner spring 110 (shown in FIG. 2) to the hub 106. Specifically, the second end portion 242 of the inner spring 110 may be wedged between the protrusion 282 and the flattened surface 284, thereby attaching the inner spring 110 to the hub 106. It is understood that while the protrusion 282 is illustrated in FIG. 5, the hub 106 may include other types of retaining features as well such as, for example, a bracket, or any receptacle that is configured to attach the second end portion 242 of the inner spring 110. Also, it is understood that in an alternative embodiment, the second end portion 242 of the inner spring 110 may include a hook (not shown in FIG. 2) to engage with the protrusion 282, thereby attaching the inner spring 110 to the hub 106.

Referring to both FIGS. 2 and 5, the second end 245 of the outer spring 112 may be disposed between an outer surface 286 of the flange 272 and the inner surface 230 of the arm arbor 140. Referring to FIG. 5, the hub 106 includes an abutment feature 290 that is a partition or a protrusion that provides a planar surface 292. The second end portion 245 of the outer spring 112 (shown in FIG. 2) abuts directly against the planar surface 292. The outward expansion of the outer spring 112 may depend on the direction of the planar surface 292. It is understood that while an abutment feature 290 is illustrated in FIG. 5, the hub 106 may include other types of retaining features as well such as, for example, a sleeve, a bracket, a recess, or any receptacle that is configured to connect the outer spring 112 with the hub 106.

Figure 6:
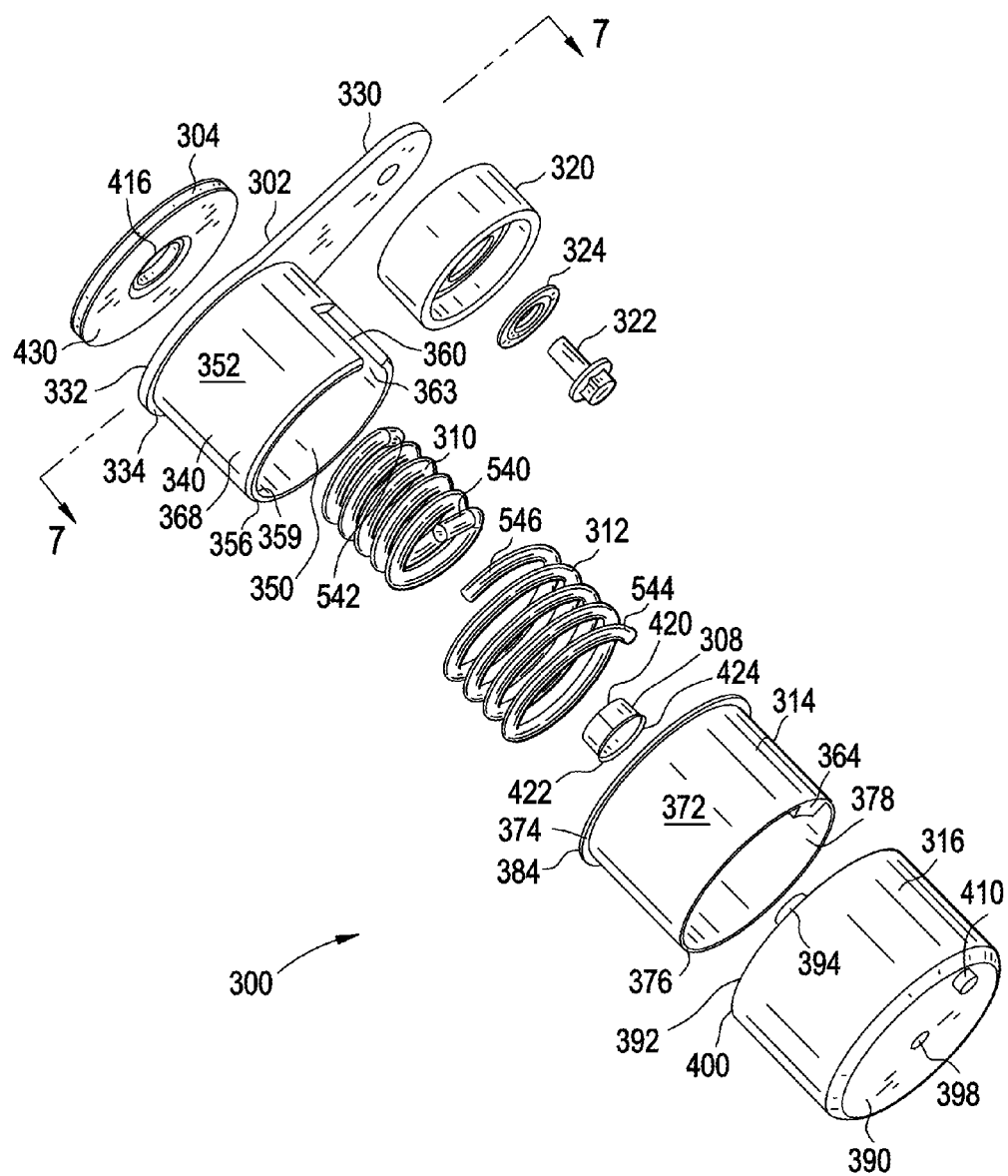
FIG. 6 is an exploded perspective view of another embodiment of a tensioner.
Figure 7:
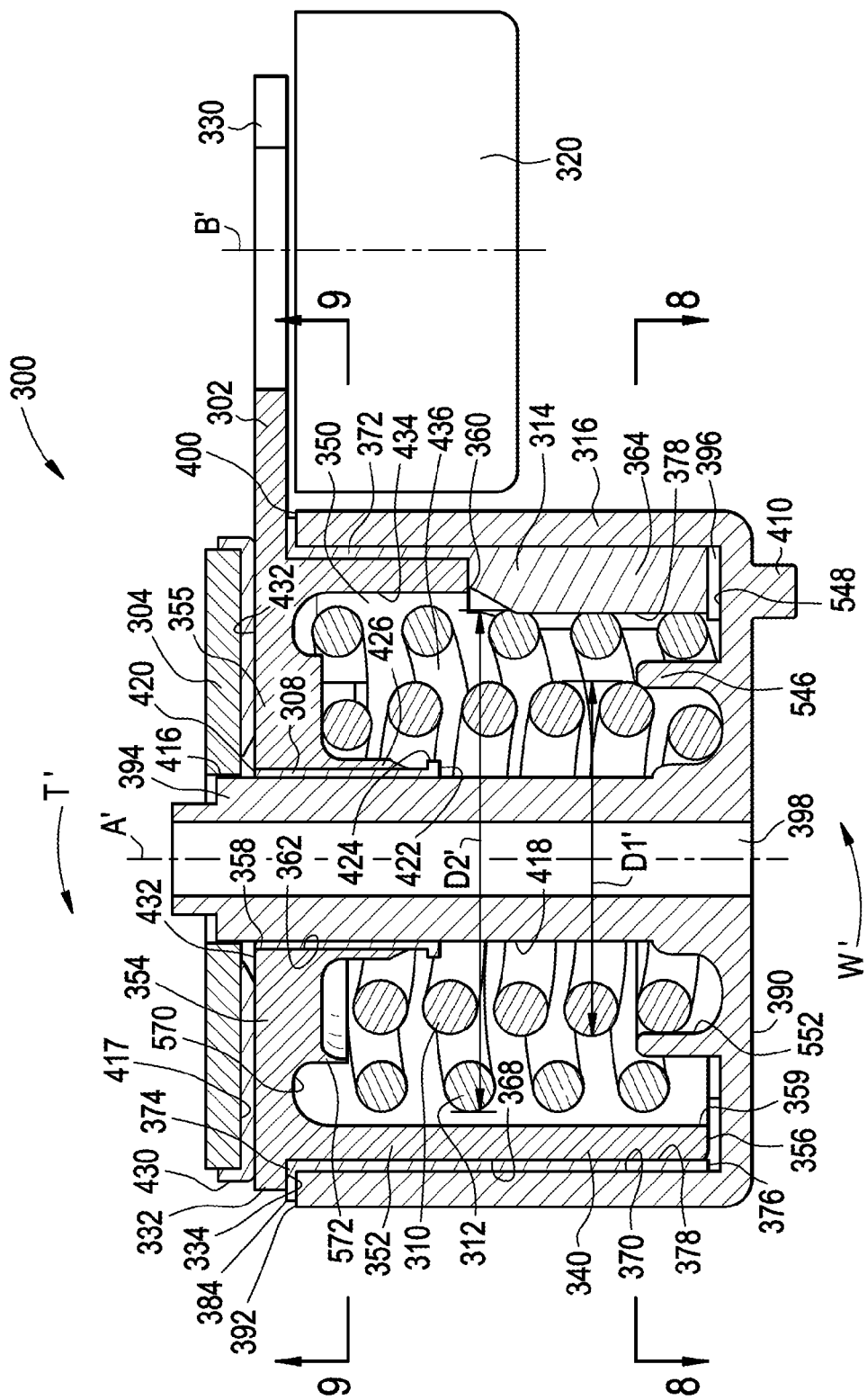
FIG. 7 is a side, partial cross-sectional view of a portion of the tensioner of FIG. 6 taken along line 7-7.

FIGS. 6-9 illustrate another embodiment of a tensioner 300, which includes an inner spring 310 and an outer spring 312 arranged in a parallel configuration. Referring to FIGS. 6-7, the tensioner 300 includes a tensioner arm 302 rotatable about a first axis A' in the tensioning direction T' and in the winding direction W'. The tensioner 300 also includes a cap 304, a pivot bushing 308, a bushing 314, and a support member 316. The arm 302 includes a pulley 320 rotatably mounted to a first end 330 of the arm 302 for rotation about a second axis B' that is spaced from and parallel to the first axis A' (the pulley 320 is not cross-sectioned in FIG. 7). The pulley 320 may be coupled to the arm 302 with a fastener 322, where the fastener 322 may secure a dust cover 324 to the pulley 320.

An arm arbor 340 is located at a second end 332 of the arm 302. The arm arbor 340 extends from a bottom surface 334 the arm 302 about the first axis A'. The arm arbor 340 may include a sleeve 352 that has a first end 354 (shown in FIG. 7) and an open second end 356. As seen in FIG. 7, the first end 354 defines a partial top 355. The partial top 355 defines an opening 358 for receiving the pivot bushing 308 and a pivot shaft 394 of the support member 316. The opening 358 of the first end 354 is smaller in size when compared to than an opening 359 defined by the second open end 356. Upon assembly of the tensioner 300, the second open end 356 of the sleeve 352 may be closed by the support member 316. The cap 304 and the support member 316 may enclose components of the tensioner 300 such as the pivot bushing 308, the inner spring 310, the outer spring 312, the bushing 314, and the arm arbor 340.

In one embodiment, the sleeve 352 of the arm arbor 340 is substantially cylindrical and includes a fixed diameter. The sleeve 352 defines a cavity 350 for receiving the inner spring 310 and the outer spring 312. Within the sleeve 352 one or more open ended slots 360 are present that extend therethrough, i.e., the slots 360 are open from the exterior surface of the arm arbor 340 and extend into an interior of the arm arbor 340. The slots 360 may include an open end 363 (shown in FIG. 6). The open end 363 of the slots 360 are located along the second open end 356 of the sleeve 352 such that a periphery of the second open end 356 of the sleeve 352 is circumferentially discontinuous. In an alternative embodiment, the slots 360 may be partially closed at a second end, which is shown in FIG. 2.

The pivot bushing 308 receives the pivot shaft 394. The pivot bushing 308 is located between an outer surface 418 of the pivot shaft 394 and an inner surface 362 of the opening 358 of the arm arbor 340. The arm arbor 340 is rotatable about the pivot shaft 394. The pivot bushing 308 may be used reduce wear of both the pivot shaft 394 and the arm arbor 340. Referring to both FIGS. 6-7, in one embodiment the pivot bushing 308 includes an upper opening 420 and a lower opening 422, where a flange 424 extends radially outward about a periphery of the lower opening 422. In one embodiment, the opening 358 of the first end 354 extends inwardly into the cavity 350 of the arm arbor 340, and defines a rim 426. The rim 426 of the first end 354 of the arm arbor 340 may be seated against the flange 424 of the pivot bushing 308.

The bushing 314 is positioned or positionable between an outer surface 368 of the arm arbor 340 and an interior surface 370 (shown in FIG. 7) of the support member 316. The bushing 314 includes a sleeve 372 having a first open end 374 and a second open end 376 and one or more protrusions 364 extending inward from an interior surface 378 of the sleeve 372 toward the first axis A'. The bushing 314 may include one or more protrusions 364, where the number of protrusions 364 preferably matches the number of slots 360 in the arm arbor 340 such that the bushing 314 is mateable with the arm arbor 340, where the protrusions 364 are received in the slots 360. Accordingly, the protrusions 364 are shaped to mate with the slots 360 of the arm arbor 340. In one embodiment, the protrusions 364 are also dimensioned to extend into the cavity 350 of the arm arbor 340 (shown in FIG. 7).

As best seen in FIG. 7, in one embodiment the support member 316 has a closed end 390 and an open end 392. The pivot shaft 394 extends from the closed end 390 towards the open end 392. The support member 316 also includes a cavity 396 that is defined by the closed end 390 and the open end 392. The arm arbor 340 is received by the cavity 396 of the support member 316. The arm 302 is rotatably mounted to the pivot shaft 394 of the support member 316, where the pivot shaft 394 defines the first axis A'. The support member 316 may facilitate mounting the tensioner 300 in place relative to the power transmitting element 21 (shown in FIG. 1). In one embodiment, the pivot shaft 194 has an axially extending opening 398 or bore that may receive a bolt, screw, pin, or other fastener 25' (shown in FIG. 1) to hold the assembled tensioner 300 together and/or to mount the tensioner 300 to a surface relative to the power transmitting element 21. In one embodiment, the support member 316 may include a positioning pin 410 located on an exterior surface of the closed end 390 of the support member 316.

In one embodiment, the support member 316 may include an upper rim 400 extending about the periphery of the open end 392 of the cavity 396. The bushing 314 may include an upper flange 384 that extends outward about the periphery of the first open end 374. The flange 384 of the bushing 314 may be seated against the upper rim 400 of the support member 316.

The cap 304 includes a generally centrally located bore 416 for receiving the pivot shaft 394, where the cap 304 is fixedly attached to the support member 316. In one embodiment, a lower surface 417 of the cap 304 (shown in FIG. 7) may include a bearing material 430. The bearing material 430 covers at least a portion of the lower surface 417 of the cap 304, and is used to reduce friction between the cap 304 and an upper surface 432 of the arm arbor 340. The bearing material 460 may be any type of material that is used to reduce friction such as, for example, nylon 6-6.

The inner spring 310 and the outer spring 312 are both operatively coupled to the arm arbor 340 and the support member 316. In the embodiment as shown, the inner spring 310 and the outer spring 312 are connected in the parallel configuration. Both the inner spring 310 and the outer spring 312 urge the arm 302 to rotate about the first axis A' about the pivot shaft 394 of the support member 316.

As best seen in FIG. 7, both the inner spring 310 and the outer spring 312 are seated within the cavity 350 in the arm arbor 340. The coils of the outer spring 312 are juxtaposed with an inner surface 434 of the arm arbor 340. The coils of the outer spring 312 are also juxtaposed with the protrusion 364 of the bushing 314. The coils of the inner spring 310 surround the outer surface 418 of the pivot shaft 394. The coils of the inner spring 310 define an inner spring coil diameter D1', and the coils of the outer spring 312 define an outer spring coil diameter D2'. The inner spring coil diameter D1' is less than the outer spring coil diameter D2' such that at least a portion of the inner spring 310 fits within or is received by the outer spring 312. That is, the coils of the outer spring 312 define a cavity 436 that receives at least a portion of the inner spring 312. Thus, at least a portion of the coils of the inner spring 310 are surrounded by the coils of the outer spring 312, and the inner spring 310 is nested at least partially within the outer spring 312. Similar to the embodiment as shown in FIGS. 2-5, although only one inner spring 310 is illustrated it is to be understood that the tensioner 300 may include multiple inner springs as well.

In the embodiment as shown in FIGS. 6-9, the inner spring 310 is wound in the winding direction W' and the outer spring 312 is wound in the tensioning direction T'. Although FIGS. 6-9 illustrate the inner spring 310 wound in the winding direction W' and the outer spring 312 wound in the tensioning direction T', it is to be understood that the inner spring 310 and the outer spring 312 may be wound in other configurations as well. For example, in an alternative embodiment the inner spring 310 may be wound in the tensioning direction T' instead, and the outer spring 312 is wound in the winding direction W'. In another embodiment, the inner spring 310 and the outer spring 312 may be wound in the same direction. For example, both the inner spring 310 and the outer spring 312 may be wound in either the tensioning direction T', or the winding direction W'.

Similar to the embodiment as illustrated in FIGS. 2-5, the specific winding direction of the inner spring 310 and the outer spring 312 may be determined based on the tensioning force the tensioner 300 is required to exert on the endless power transmitting element 21 (FIG. 1). The winding direction of the inner spring 310 and the outer spring 312 may also be determined based on a damper or damping mechanism, for example a frictional damper, that is incorporated with the tensioner 300. Specifically, similar to the embodiment as illustrated in FIGS. 2-5 the inner spring 310 and the outer spring 312 may be wound in a variety of configurations to provide asymmetric damping or symmetric damping.

Figure 8:
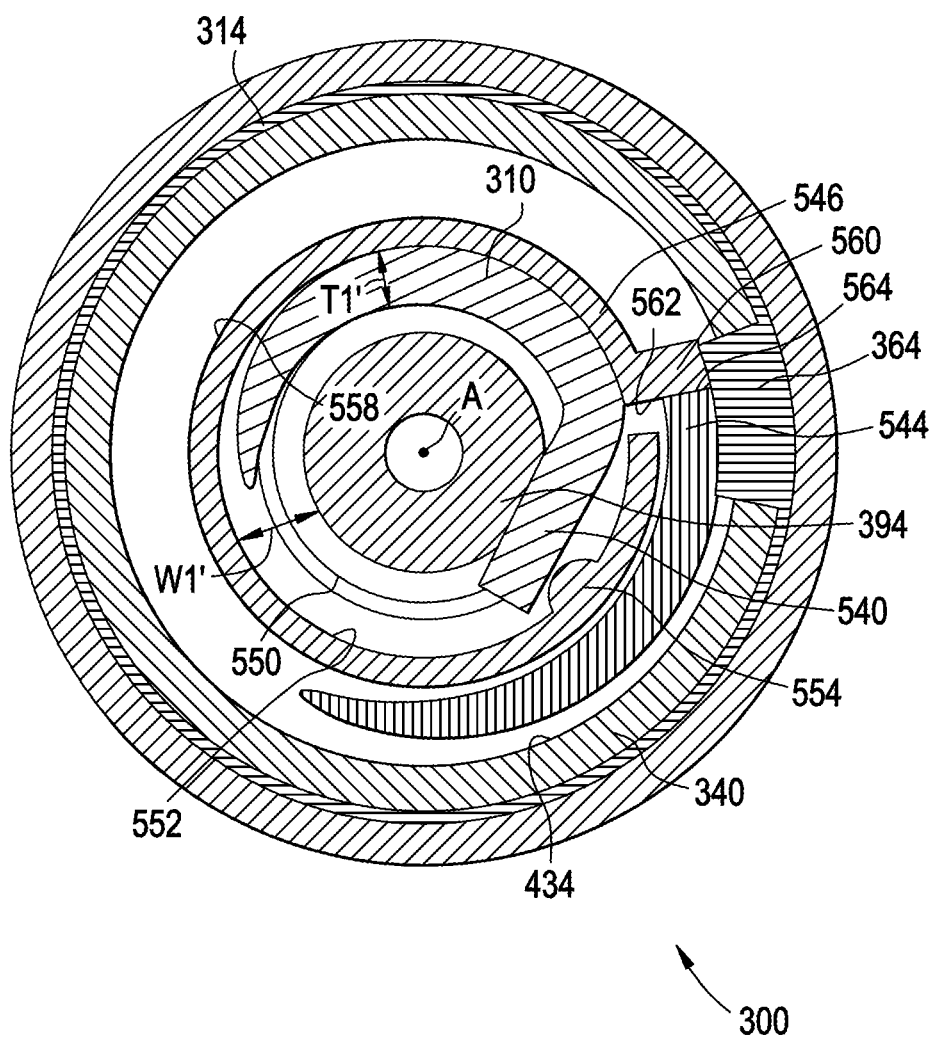
FIG. 8 is a cross-sectional view of the tensioner of FIG. 7 taken along line 8-8.

Referring to FIGS. 6-8, the inner spring 310 includes a first end portion 540 and a second end portion 542. The inner spring 310 is fixedly attached to the support member 316. The inner spring 310 is also fixedly attached to the arm arbor 340. Specifically, the first end portion 540 of the inner spring 310 is fixedly attached to the support member 316, and the second end portion 342 of the inner spring 310 is fixedly attached to the arm arbor 340. The outer spring 312 also includes a first end portion 544 and a second end portion 545. The outer spring 312 is connected to the support member 316 and the arm arbor 340. Specifically, the first end portion 544 of the outer spring 312 is connected to the support member 316, and the second end portion 545 of the outer spring 312 is connected to the arm arbor 340.

The support member 316 includes a flange 546 (shown in FIGS. 7-8) that is located along a bottom surface 548 (shown in FIG. 7) of the closed end 390 of the support member 316. The flange 546 projects inwardly into the cavity 396 of the support member 316. As shown in FIG. 8, the pivot shaft 394 and the flange 546 cooperate together to define a track 550. The track 550 may include a generally annular configuration, and may match the curvature of the inner spring 310. The track 550 may include a width W1' that is greater than a thickness T1' of the coil of the inner spring 310 such that the coils of the inner spring 310 may expand or contract within the track 550.

Referring to FIG. 8, an inner surface 552 of the flange 546 that generally opposes the pivot shaft 394 may include a retaining feature such as, for example, a protrusion 554 that extends inward towards the first axis A'. The protrusion 554 and the pivot shaft 394 corporate together to fixedly attach the first end portion 540 of the inner spring 310 to the support member 316. Specifically, the first end portion 540 of the inner spring 310 is wedged between the protrusion 554 and the pivot shaft 394, thereby securing the inner spring 310 to the support member 316. It is understood that while the protrusion 554 is illustrated in FIG. 8, the support member 316 may include other types of retaining features as well such as, for example, a bracket, or any receptacle that is configured to fixedly attach the first end portion 540 of the inner spring 310 to the support member 316. Also, it is understood that in an alternative embodiment, the first end portion 540 of the inner spring 310 may include a hook (not shown). The hook acts as a catch to engage with the protrusion 554, thereby attaching the inner spring 310 to the support member 316.

The first end 544 of the outer spring 312 may be disposed between an outer surface 558 of the flange 546 and the inner surface 434 of the arm arbor 340. Referring to both FIGS. 7-8, the support member 316 includes an abutment feature 560 (shown in FIG. 8). As seen in FIG. 8, in one embodiment the abutment feature 560 is a partition or a protrusion that provides a generally planar surface 562, where a planar surface 564 of the first end portion 544 of the outer spring 312 abuts directly against the abutment feature 560. Although a planar surface 562 is shown in FIG. 8, it is to be understood that in an alternative embodiment the abutment feature 560 may be a sleeve, a bracket, a recess, or another receptacle that the first end portion 544 of the outer spring 312 fits into to connect the outer spring 312 to the support member 316.

Referring to FIG. 7, an inner surface 570 of the partial top 355 of the arm arbor 340 may include a flange 572 that extends inwardly into the cavity 350 of the arm arbor 340. The flange 572 is located radially outward of the rim 426. Both the rim 426 and the flange 572 cooperate together to define a track 576 (shown in FIG. 9). The track 576 may include a generally annular configuration, and may match the curvature of the inner spring 310. The track 576 may include a width W2' that is greater than the thickness T1' of the coil of the inner spring 310 such that the coils of the inner spring 310 may expand or contract within the track 576.

Figure 9:
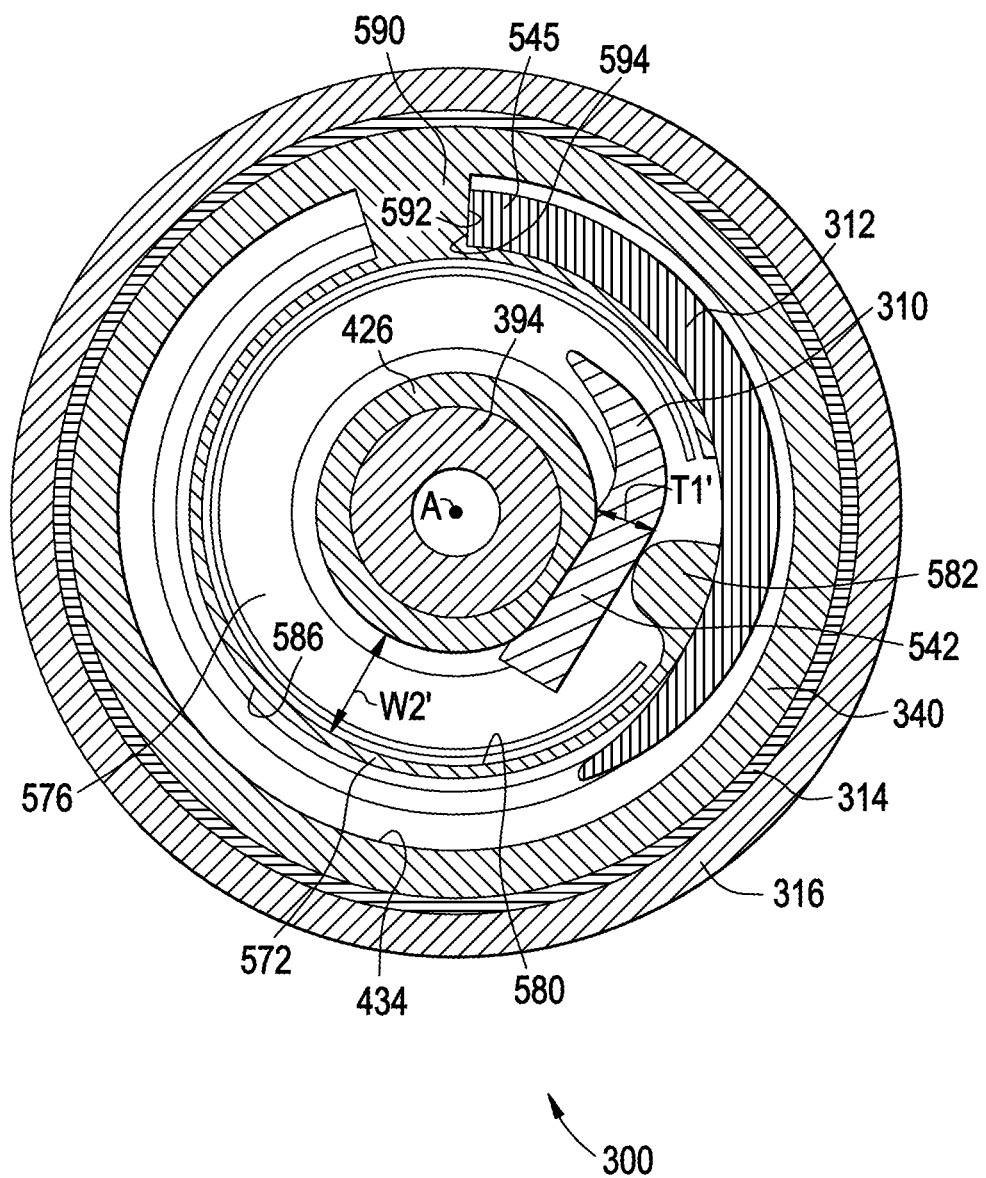
FIG. 9 is a cross-sectional view of the tensioner of FIG. 7 taken along line 9-9.

An inner surface 580 of the rim 572 may include a retaining feature such as, for example, a protrusion 582 (shown in FIG. 9) that extends inward towards the first axis A'. The protrusion 582 and the rim 426 corporate together to secure the second end portion 542 of the inner spring 310 to the arm arbor 340. Specifically, the second end portion 542 of the inner spring 310 may be wedged between the protrusion 582 and the rim 426, thereby attaching the inner spring 310 to the arm arbor 340. It is understood that while the protrusion 582 is illustrated in FIG. 9, the arm arbor 340 may include other types of retaining features as well such as, for example, a bracket, or any receptacle that is configured to attach the second end portion 542 of the inner spring 310. Also, it is understood that in an alternative embodiment, the second end portion 542 of the inner spring 310 may include a hook (not shown in FIG. 9) to engage with the protrusion 582, thereby attaching the inner spring 310 to the arm arbor 340.

Referring to both FIGS. 6 and 9, the second end 545 of the outer spring 312 may be disposed between an outer surface 586 of the flange 572 and the inner surface 434 of the arm arbor 340. The first end 354 of the arm arbor 340 includes an abutment feature 590 is a partition or a protrusion that provides a generally planar surface 592, where a planar surface 594 of the second end portion 545 of the outer spring 312 abuts directly against the abutment feature 590. Although a planar surface 592 is shown in FIG. 9, it is to be understood that in an alternative embodiment the abutment feature 590 may be a sleeve, a bracket, a recess, or another receptacle that the first end portion 545 of the outer spring 312 fits into to connect the outer spring 312 to the arm arbor 340.

Referring generally to FIGS. 1-9, the inner spring 110 and the outer spring 112 are connected with one another in either a series configuration (shown in FIGS. 2-5) or a parallel configuration (shown in FIGS. 6-9 as the inner spring 310 and the outer spring 312), and operate as a single, compact torsion spring. Arranging the inner spring 110 and the outer spring 112 in the series configuration may result in a lower spring rate when compared to the parallel configuration. Thus, the series configuration is typically used in applications where the arm 102 of the tensioner 100 requires longer travel or rotation at a generally steady-state torque. In contrast, arranging the inner spring 310 and the outer spring 312 in the parallel configuration may result in a higher spring rate when compared to the series configuration. Thus, the parallel configuration is typically used in applications where the arm 302 of the tensioner 300 requires shorter travel and a relatively quick take-up or rotation of the arm 302 is needed.

The multiple nested torsion springs as disclosed may be beneficial in applications where relatively large torsional loads (e.g., typically greater than about 90 Nm for a 100 millimeter diameter package) are experienced by the power transmitting element 21, especially if packaging space for the tensioner is limited. Some types of belt tensioners that are currently available include a single torsional spring that has an increased height and/or width. Specifically, the height and/or width of the torsional spring is increased in an effort to counteract relatively large torsional loads that may be experienced by a belt. However, these types of belt tensioners also require more packaging space due to the increased height and/or width of the torsion spring. In contrast, the tensioner as disclosed utilizes multiple torsion springs that are nested within one another. The multiple torsional springs require less packaging space when compared to a single torsion spring having an increased height and/or width.

The embodiments of this invention shown in the drawing and described above are exemplary of numerous embodiments that may be made within the scope of the appended claims. It is contemplated that numerous other configurations of the tensioner may be created taking advantage of the disclosed approach. In short, it is the applicant's intention that the scope of the patent issuing herefrom will be limited only by the scope of the appended claims.

What is claimed is:

1. A tensioner comprising:
an arm rotatable about a first axis, the arm comprising an arm arbor, the arm arbor having a sleeve, wherein the sleeve defines an open end;
an outer spring operatively coupled to the arm, the outer spring having an outer coil that defines an outer diameter;
a support member for receiving the arm arbor and the outer spring, wherein the support member is stationary and includes a pivot shaft that defines the first axis;
a hub defining an opening for receiving the pivot shaft of the support member, wherein the hub closes the open end of the sleeve; and
at least one inner spring operatively coupled to the arm, the inner spring having an inner coil that defines an inner diameter, the inner diameter of the inner coil being less than the outer diameter of the outer coil such that at least a portion of the inner spring is received by the outer spring, and wherein the outer spring and the inner spring both urge the arm to rotate about the first axis into tensioning engagement with a power transmitting element, and wherein the hub connects the inner spring with the outer spring such that the inner spring and the outer spring are connected to one another in series and share torque between one another.

2. The tensioner of claim 1 wherein a first end portion of the inner spring is fixedly attached to the support member.

3. The tensioner of claim 2 wherein a second end portion of the inner spring is fixedly attached to the arm arbor.

4. The tensioner of claim 2 wherein a first end portion of the outer spring is connected to the support member.

5. The tensioner of claim 4 wherein a second end portion of the outer spring is connected to the arm arbor.

6. The tensioner of claim 2 wherein a first end portion of the outer spring is connected to the arm arbor.

7. The tensioner of claim 6, wherein the arm arbor is rotatably mounted to the pivot shaft.

8. The tensioner of claim 1 wherein a second end portion of the inner spring is fixedly attached to the hub.

9. The tensioner of claim 1 wherein a second end portion of the outer spring is connected to the hub.

10. The tensioner of claim 1 wherein the inner spring and the outer spring are wound in opposing directions.

11. The tensioner of claim 1 wherein the inner spring and the outer spring are both wound in a same direction.

12. A tensioner comprising:

an arm having an arm arbor, the arm arbor defining an arm arbor, and a sleeve, wherein the sleeve defines an open end;

a support member, wherein the support member is stationary and includes a pivot shaft that defines the first axis;

an outer spring operatively coupled to the arm, the outer spring having an outer coil that defines an outer diameter, a first end portion and a second end portion, wherein the first end portion of the outer spring is connected to the arm arbor;

a hub defining an opening for receiving the pivot shaft of the support member, wherein the hub closes the open end of the sleeve, wherein the second end portion of the outer spring is connected to the hub; and at least one inner spring operatively coupled to the arm, the inner spring having an inner coil that defines an inner diameter, the inner diameter of the inner coil being less than the outer diameter of the outer coil such that at least a portion of the inner spring is received by the outer spring, and wherein the outer spring and the inner spring both urge the arm to rotate about the first axis into tensioning engagement with a power transmitting element, wherein the hub connects the inner spring with the outer spring such that the inner spring and the outer spring are connected to one another in series and share torque between one another, and wherein the support member receives the arm arbor, the inner spring, and the outer spring.

13. The tensioner of claim 12 wherein a first end portion of the inner spring is fixedly attached to the support member.

14. The tensioner of claim 13 wherein a second end portion of the inner spring is fixedly attached to the arm arbor.

15. The tensioner of claim 13 wherein a second end portion of the inner spring is fixed attached to the hub.

* * * * *